Jan. 31, 1939.  M. WADDELL  2,145,467
MOTOR MOWER UNIT
Filed Jan. 15, 1937  8 Sheets-Sheet 1
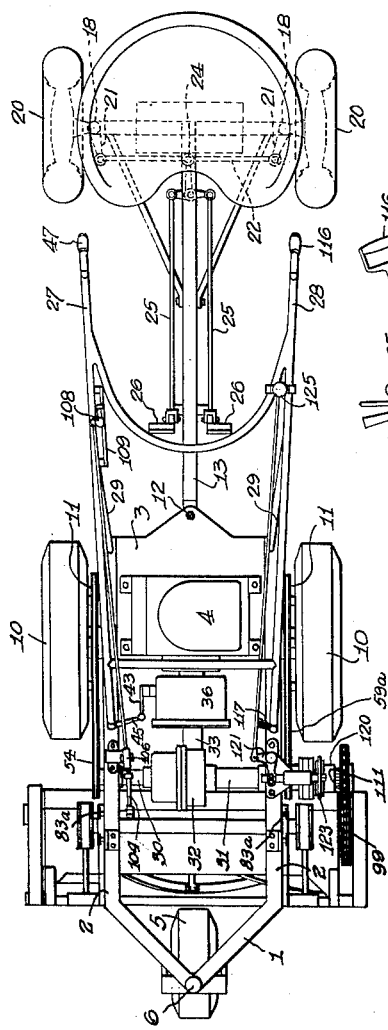
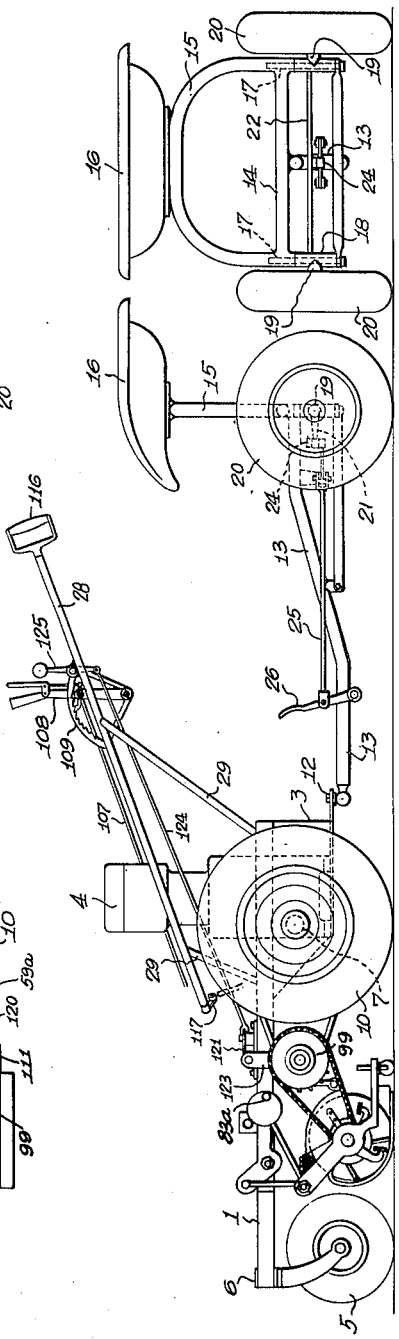
INVENTOR
Melvin Waddell,
BY
ATTORNEYS

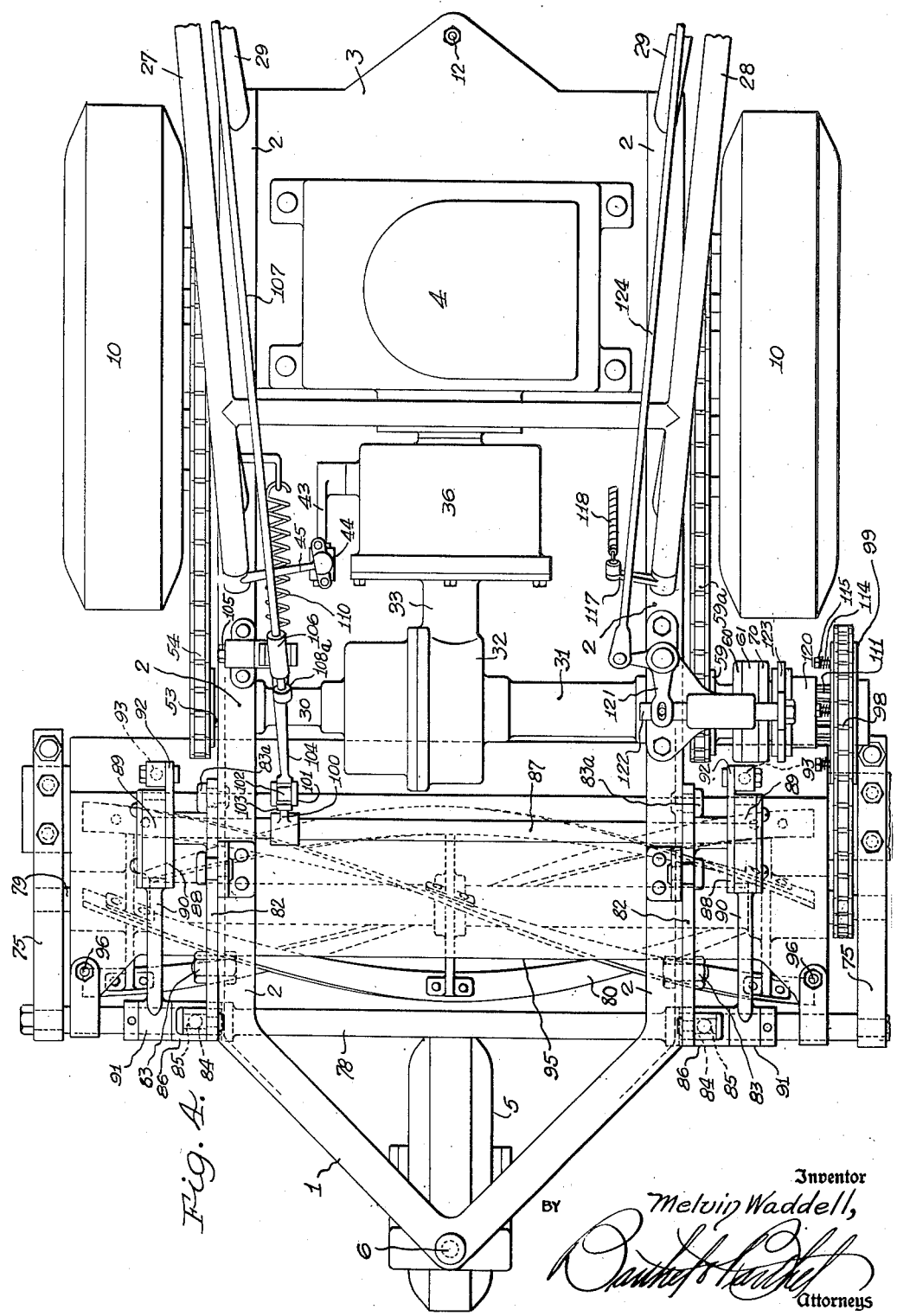

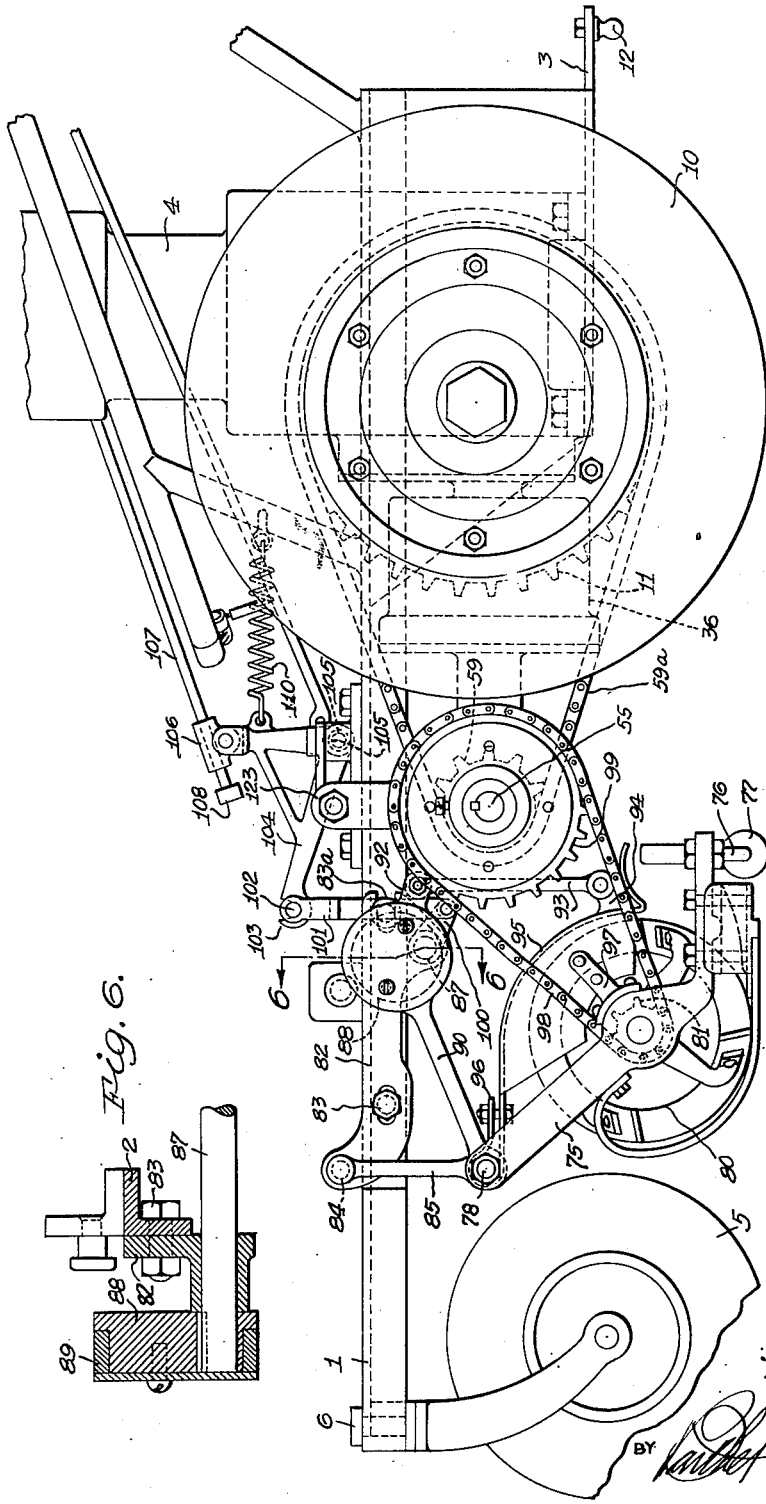

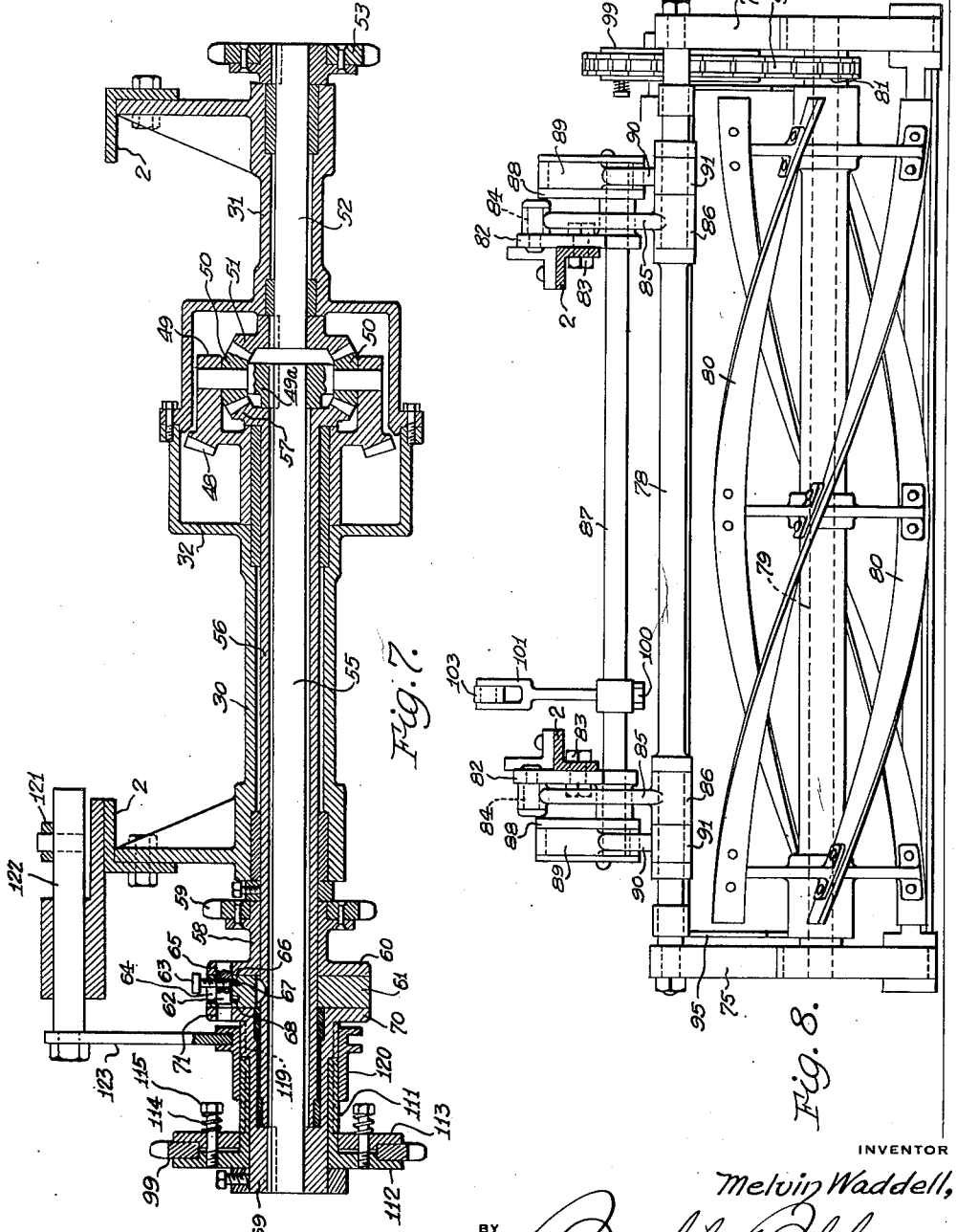

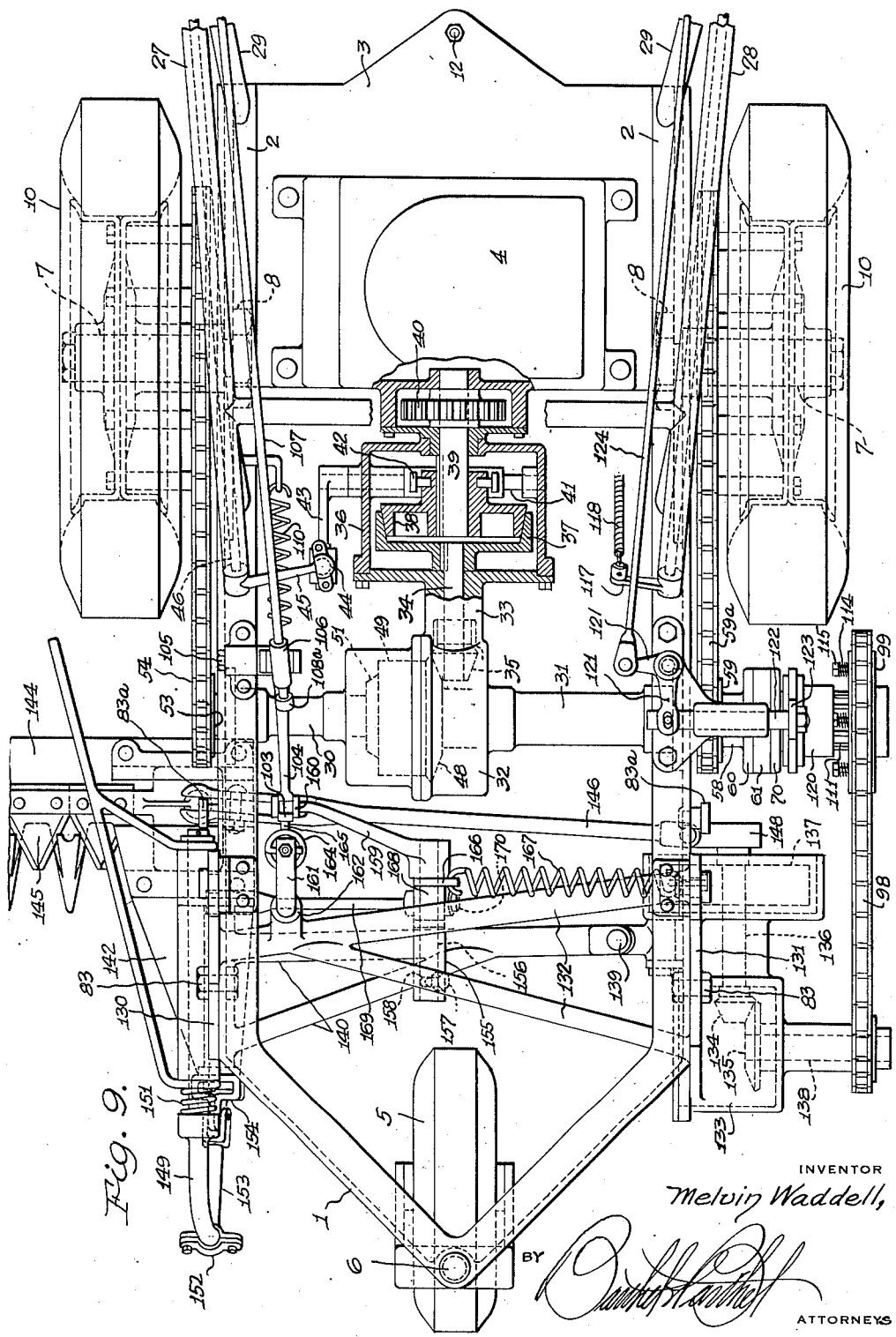

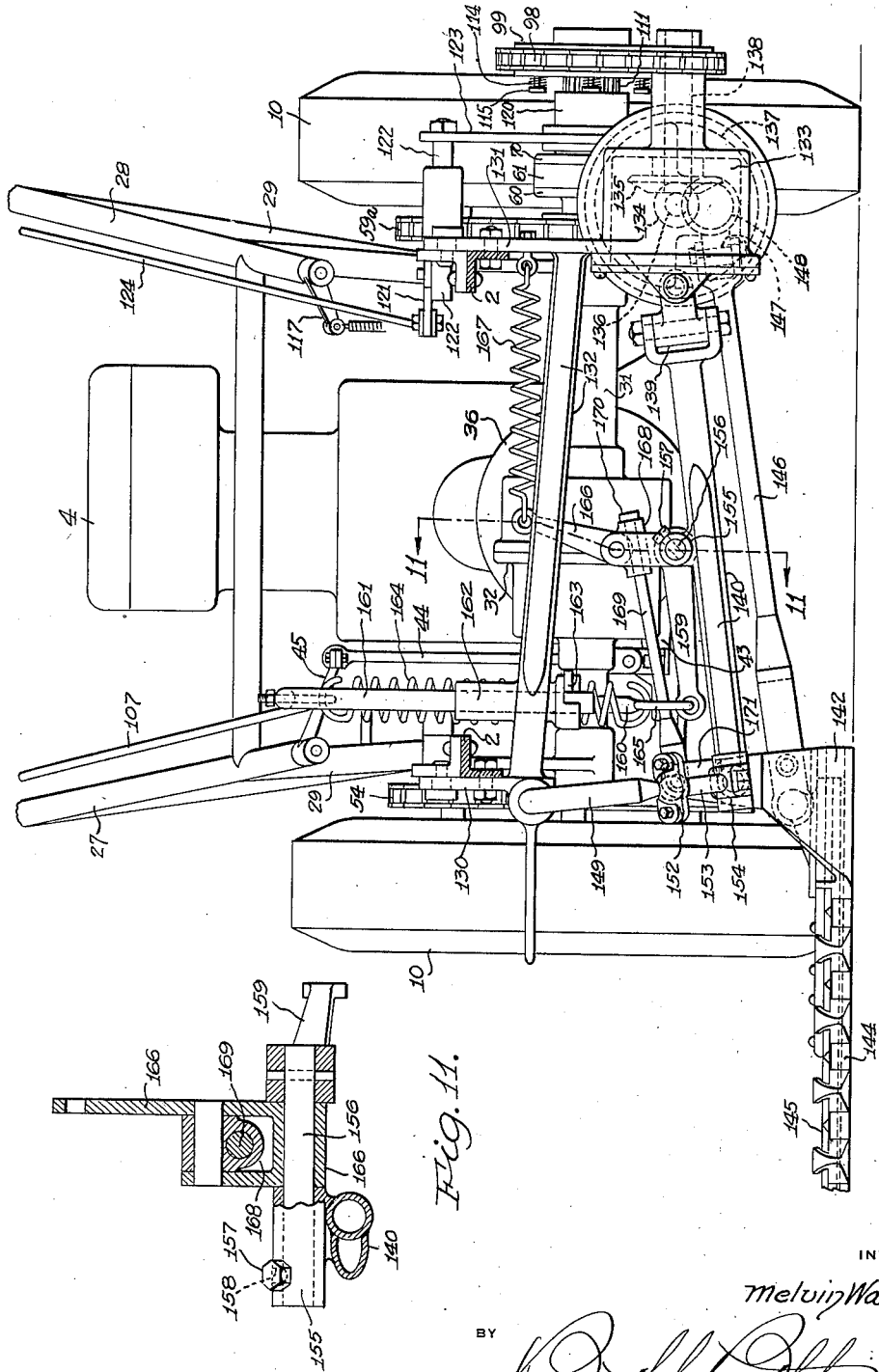

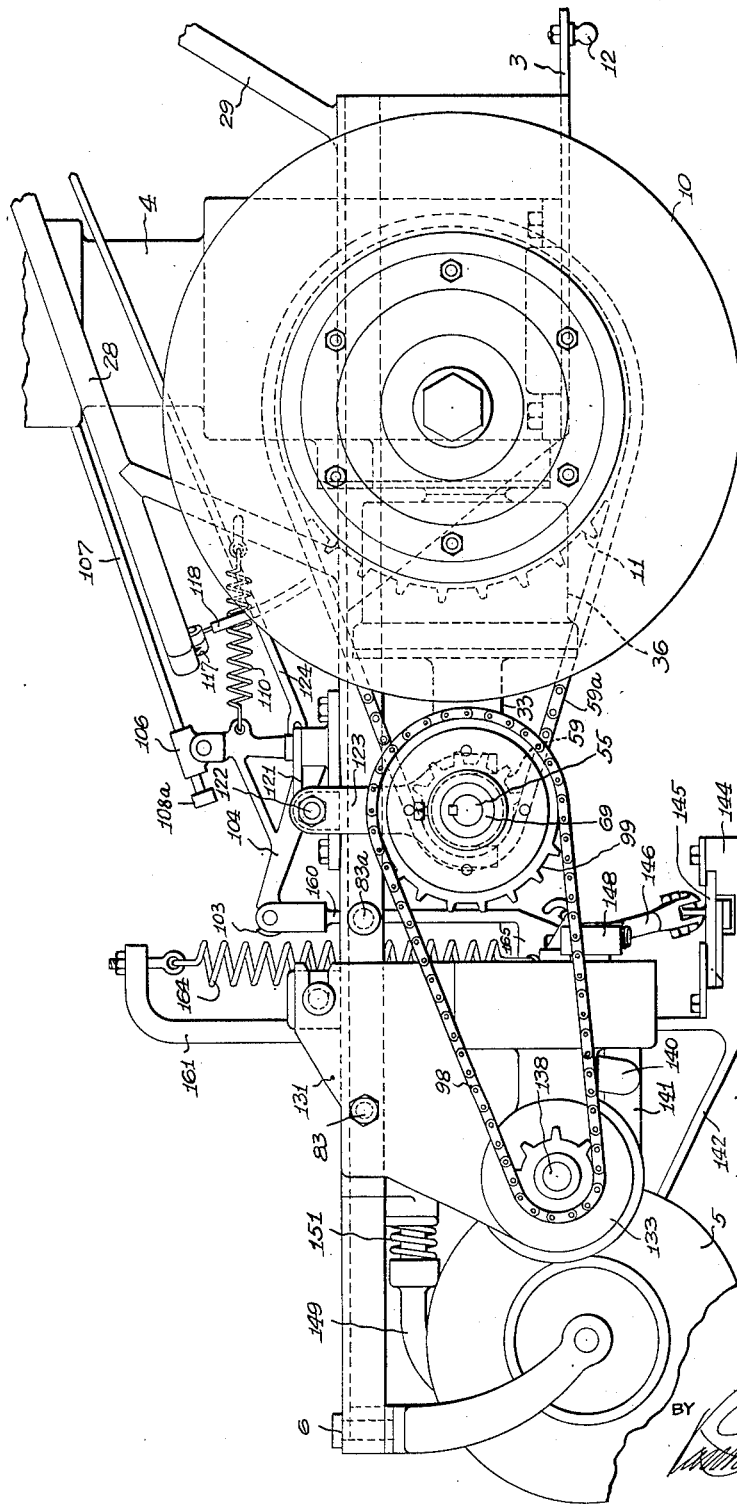

Patented Jan. 31, 1939

2,145,467

UNITED STATES PATENT OFFICE 2,145,467

MOTOR MOWER UNIT

Melvin Waddell, Altoona, Kans.

Application January 15, 1937, Serial No. 120,641

17 Claims. (Cl. 56—7)

The present invention relates to power mowers and has as its primary object to provide a unit having a low center of gravity so that it may be maneuvered over inclinations without danger of tipping or toppling over. In this connection a wheeled frame is provided with a platform for the support of the power unit and the frame, platform and wheels are so arranged that the support for the engine is below the axles upon which the wheels rotate. This disposition of the engine, which provides a major portion of the weight, tends to stabilize and prevent tipping of the unit when it is moved over inclined surfaces.

Another object of the invention is to support the power plant below the centers of the traction wheels and also between the wheels so that the weight thereof falls directly on the wheels to increase the traction thereof.

Another object of the invention is to provide a sulky and means for attaching it to the powered mower unit whereby it trails the same, the means for attaching the sulky to the mower unit being disposed with respect to the wheels whereby it increases the stability of the unit and increases the wheel traction.

Another object of the invention is to provide a sulky with dirigible wheels and a seat and means whereby an operator sitting upon said seat may operate the dirigible wheels to steer the movements of the sulky with respect to the tractor mower unit.

Another object of the invention is to provide a power mower with a trailing sulky and an articulated connection therebetween whereby the mower is steered by causing relative articulation between the mower and sulky. In this connection handle bars are provided on the mower which may be grasped by an operator riding upon the sulky so that by pushing the handle bars to the left or right relative articulation takes place between the mower and sulky and the steering function attained.

Another object of the invention is to provide a power mower with a master clutch for rendering the propelling members operative or inoperative at the will of the operator, and to provide controls for the clutch disposed within one of the handle bars through which the operator steers the power mower. The operator may, therefore, control the movements of the mower very accurately with respect to trees, shrubs, hedges etc. and may control the drive while in the act of steering the mower.

Another object of the invention is to provide a motor mower unit with differential gearing between the propelling wheels thereof to easily permit steering thereof and to allow a comparatively large mower unit to make quick, short turns and to steer closely around trees and flower beds. With a differential gearing present, however, the use of a sickle bar, for cutting weeds etc., which cannot be cut by a cutting reel, requires that the differential gearing be rendered inoperative. The sickle bar projects outwardly on one side of the mower unit and with the differential gearing functioning the tendency is for the mower unit to move in a circular path when the sickle bar meets with a resistance to movement. Under such circumstances the operator would be required to exert sufficient pressure on the steering means to overcome the resistance to movement of the sickle bar. Accordingly, it is another object of the invention to provide means for rendering the differential gearing inoperative when the sickle bar is in use or when the ground surfaces are such that the differential gearing makes steering more difficult, rather than making it considerably easier as it does under ordinary conditions of operation and while operating a cutting reel. Simultaneous with the operation of the differential lock thus provided the driving wheel on the side remote from the sickle bar is also rendered inoperative.

Another object of the invention is to provide a motor mower unit for interchangeably receiving either a cutting reel or a sickle bar type of cutter. By accomplishing this the mower unit becomes capable of universal use in that the sickle bar may be substituted for the cutting reel for the purpose of cutting weeds etc. which cannot be mowed by any cutting reel.

Another object of the present invention is to provide means for supporting a cutting reel in a mower unit so that it may move vertically when surface irregularities are met with and for maintaining the distance between the sprocket on the cutting reel and its driving sprocket substantially constant during such vertical movements.

Another object of the invention is to provide means operable from a point adjacent the steering bars whereby the operator may cause the cutting reel to be raised or lowered at will. In this connection, it is a still further object to provide a support for the reel and means for raising and lowering the reel so constructed and arranged as to permit the use of springs for counter-balancing the weight of the reel. Movements of the reel vertically, either as a result of contact with surface irregularities or operation of the manual raising and lowering mechanism are therefore, more smooth and more easily attainable.

Another object of the present invention is to provide a motor mower unit embodying a mower and means between the mower and the power plant which operates the same for preventing damage to the mower in the event the cutting device picks up obstructions like twigs, stones etc. This means is in the form of a clutch normally held engaged by resilient means which permits slipping of the same in the event an obstruction is picked up by the mower.

Still another object is to provide a motor mower unit with operating means and controls therefor for operating either a reel type cutter or a sickle bar type cutter interchangeably.

With the above objects in view, and with others which will become apparent from the following description, the invention is fully described with reference to the accompanying drawings, in which Figure 1 is a plan view of the intercoupled mower and sulky units;

Fig. 2 is a side elevation corresponding to Fig. 1;

Fig. 3 is an end elevation of the sulky;

Fig. 4 is an enlarged plan of the mower unit with a cutting reel assembled thereon;

Fig. 5 is a side elevation of the mower unit;

Fig. 6 is a section taken on the line 6—6 of Fig. 5 and illustrating a detail;

Fig. 7 is a section illustrating the power transmitting and differential mechanism;

Fig. 8 is an elevation of the cutting reel;

Fig. 9 is a plan of the mower unit with a sickle bar assembled thereon;

Fig. 10 is a front elevation, with a part of the mower unit frame removed, and illustrating the sickle bar;

Fig. 11 is a section taken on the line 11—11 and illustrating a detail, and

Figs. 12 and 13 are opposite side elevations.

Like characters of reference are employed throughout to designate corresponding parts.

Figure 13:
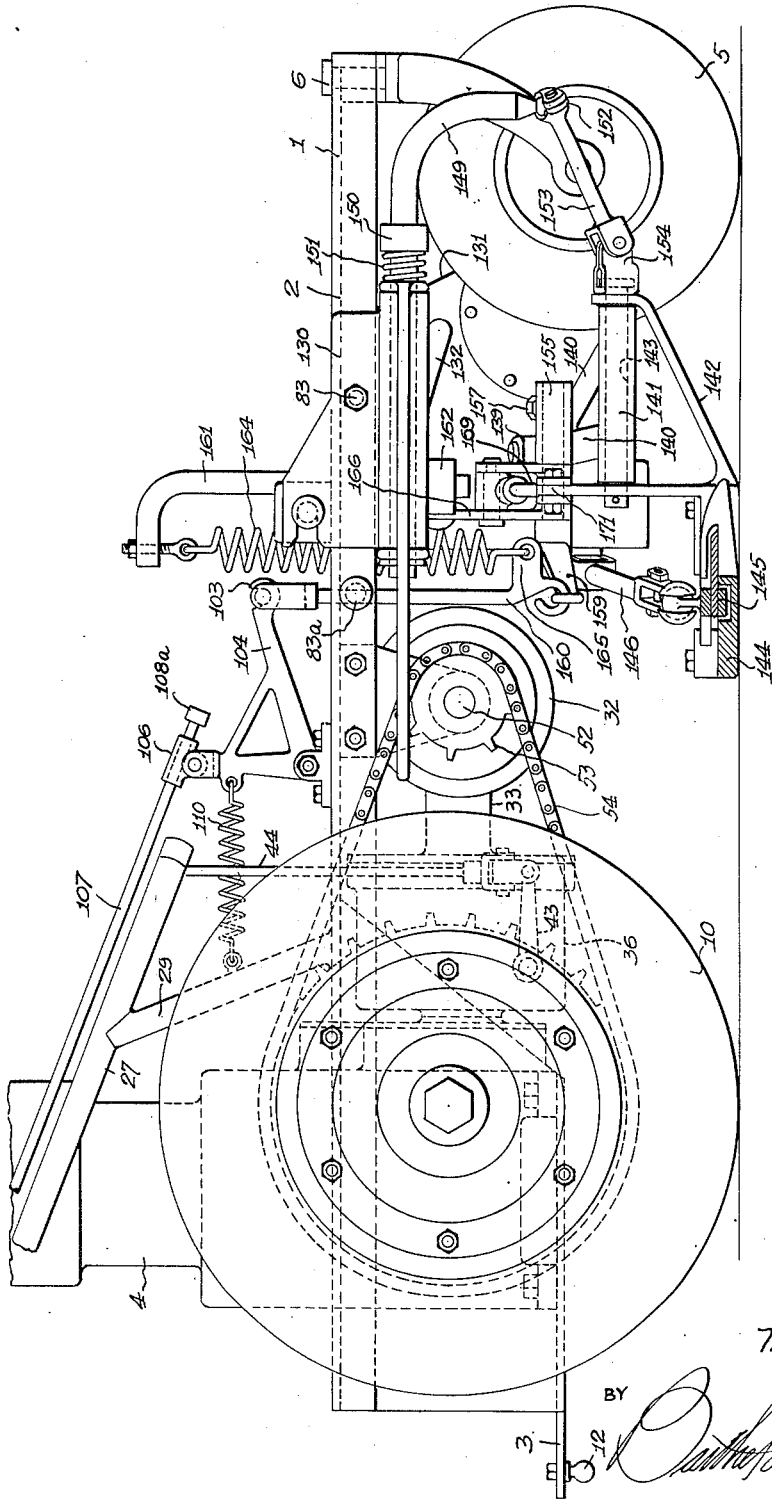

Referring to the drawings, the numeral 1 designates a substantially U-shaped mower unit frame having two arms 2 extending rearwardly, substantially parallel. The frame 1 is preferably formed of angle irons and the ends of the two arms 2 are united by a cross frame structure 3. The cross frame structure 3 depends beneath the arms 2 and constitutes, in one respect, a supporting platform for a power plant 4 which is preferably an internal combustion engine. The forward end of the U-shaped frame 1 is supported by a single wheel 5, attached to the frame by a vertical swivel 6 so that it may swing about a vertical axis after the fashion of a caster. Adjacent the ends of the frame arms 2 are provided stub axle spindles 7, (Figs. 2 and 9) secured to the vertical sides of the platform 3 by nuts 8. The connection of the stub axle spindles to the platform 3 is shown only in Fig. 9. Wheels 10 are rotatably supported by the stub axle spindles and have sprockets 11 secured thereto.

The above described structure relates to the wheeled frame for supporting the mower and power units, and it will be noted that the engine 4 which provides a major portion of the weight, is supported quite low. Actually, the platform 3 is lower than the axles upon which the rear wheels rotate and the center of gravity is quite low. This characteristic is important inasmuch as it permits the mower unit, as will hereinafter be described, to be maneuvered over inclinations without danger of it tipping over. It will also be noted that the engine is disposed between the wheels 10, which are the propelling wheels, and the weight thereof increases their traction.

At its rear edge, and centrally between the wheels 10, the platform 3 is provided with a vertical swivel 12 for attaching the draw bar 13 of a sulky thereto. To the rear end of the draw bar 13 is secured a transverse sulky frame member 14 having an inverted U-frame 15 secured thereto, extending vertically with respect thereto, and supporting an operator's seat 16. The sulky frame members 14 and 15 support vertical spindles 17 upon which steering knuckles 18 are mounted. Each steering knuckle 18 has a spindle 19 rotatably supporting a wheel 20. Attached to each knuckle 18 is an arm 21 and the two arms on the separate knuckles are connected by a rod 22. A T-shaped lever 23 has one of its arms pivotally connected to the rod 22, as designated at 24, and the other two arms individually connected by links 25 to foot pedals 26.

From the description immediately above it becomes apparent that the sulky trails the mower unit and that the operator may, by selectively pressing the pedals 26, cause movement of the steering knuckles. The sulky may, therefore, be steered with respect to the mower unit. The advantages resulting from such a function will become more apparent when an understanding of the mode of steering the mower unit is described in a later stage of the description. It will also be noted, that a part of the weight of the sulky, as well as the weight of the operator, is imposed on the platform 3 and, due to the above pointed out disposition of the latter, increases the stability of the mower unit and increases the traction of the propelling wheels.

It is apparent, from the foregoing, that the mower unit and the sulky are relatively articulated. In order that an operator, riding upon the sulky, may cause relative articulation at will for steering purposes two handle bars 27 and 28 are provided. The two handle bars include hollow elements attached to respective frame portions 2 by rigid supports 29. By pushing the handle bars to the left or to the right the operator may cause relative articulation between the mower and sulky. The handle bars 27 and 28 also support and enclose control elements as will hereinafter be described.

Supported by the frame members 2, in advance of the wheels 10, are two housings 30 and 31 having complemental bell ends forming a differential housing 32. A torque tube 33 is secured at one end to the differential housing 32 and at its other end to a clutch housing 36 and rotatably supports a propeller shaft 34. A bevel gear 35 is disposed within the differential housing 32 and connected to one end of the shaft 34. The other end of the shaft 34 extends into the clutch housing 36 and has a clutch part 37 keyed thereon. The clutch part 37 has an annular tapered surface adapted to be frictionally engaged by the cone clutch element 38 which is slidably keyed on the shaft 39. The shaft 39 is connected by a gear 40 to the crank shaft (not shown) of the engine 4.

The means for engaging and disengaging the clutch at the will of the operator comprises a shaft 41, rotatably supported in the clutch housing 36 and having a fork 42 engaging the slidable clutch element 38. One end of the shaft 41 projects through the wall of the housing 36 and on this projecting end is mounted a lever arm 43. The lever arm 43 is connected by a universally swivelling connector 44 to a lever arm 45 which is secured to the lower end of a rod 46. The rod 46 is rotatably supported in the hollow handle bar member 27 and has a handle piece 47 on its upper end. An operator, riding upon the sulky may, without inconvenience and without interruption of the steering function, rotate the rod 46 and cause engagement or disengagement of the clutch.

The bevel gear 35, above described, meshes with a bevelled ring gear 48 in the housing 32. As shown more clearly in Fig. 7, the ring gear 48 has an integral annular formation 49 engaging a spider formation 49a carrying the pinions 50 of the differential gearing. The pinions mesh with a bevelled gear 51 on a shaft 52 rotatably journaled in the housing 31 and having a sprocket 53 on the projecting end thereof. The sprocket 53 is connected by a chain 54 to the sprocket 11 on the adjacent wheel 10.

The spider formation 49a is mounted upon a shaft 55 which extends through a hollow shaft 56 carrying on its inner end a bevelled gear 57 meshing with the pinions 50. Both shafts 55 and 56 are rotatably mounted in the housing member 30 and rotatably mounted on the hollow shaft 56, externally of the housing 30, is a sleeve 58. On one end of the sleeve 58 is a sprocket 59, connected to the sprocket 11 on the other wheel 10 by a chain 59a, and on its other end is a flange 60. A collar 61 is keyed to the hollow shaft 56 adjacent the flange 60 and has a pin 62 slidably mounted therein. In the pin 62 is a set screw 63 which projects through a slot 64 therein. With the parts as shown in Fig. 7 the pin 62 is held projecting into an aperture 65 by the small end 66 of the set screw engaging a hole 67 in the collar 61. The pin 62 therefore provides a driving connection between the collar 61, which is keyed to the hollow shaft 56, and the sleeve 58 which is loose with respect to the shaft. By loosening the set screw 63 and moving the pin 62 to the left, as shown in Fig. 7, the end of the pin may be retracted from the aperture 65. A second hole 68 is provided for the reception of the small end 66 of the set screw for holding the pin 62 retracted from the aperture 65.

Keyed on the outer end of the shaft 55 is a sleeve 69 having a flange 70, similar to the flange 60, disposed immediately adjacent to the collar 61. The flange 70 has an aperture 71 and when the pin 62 is moved toward the left, as shown in Fig. 7, to retract its end from the aperture 65 as above described, the other end is projected into the aperture 71 of the flange 70. When such a function takes place the pin 62 establishes a driving connection between the collar 61 which is keyed to the shaft 56, and the sleeve 69 which is keyed to the shaft 55. This driving connection prevents relative rotation between the spider 49a and the gear 57 and therefore renders the differential gearing inoperative so that, in the event the ring gear 48 is rotated, the sprocket 53 is caused to rotate. When the pin 62 is withdrawn from the aperture 65 the sprocket 59 is free to rotate and, therefore, the drive at this time is through one wheel only.

From the description immediately foregoing it becomes apparent that the motor mower has a differential gearing between its two propelling wheels and that said differential gearing may be rendered inoperative, and furthermore, the unit may be driven by one wheel.

As stated above, an object of this invention is to provide a mower capable of universal service and this is accomplished by providing for the operation of either a cutting reel or a sickle bar cutter by the above described mechanism. Both the cutting reel assembly and the sickle bar are shown in the drawings, and the following description refers first to the cutting reel assembly and installation.

Referring to Figs. 4, 5 and 8 it will be seen that the cutting reel comprises two inclined side members 75. The rear, lower ends of the side members 75 are united by a transverse rod 76, upon which a roller 77 is rotatably mounted, and the two upper, forward ends are united by a rigid transverse rod 78. A transverse shaft 79 has a cutting reel 80 rotatably mounted thereon and a sprocket 81 is connected to the cutting reel. Two brackets 82 are secured to the frame members 2 by removable bolts 83, and a slot and pin connection 83a, and each bracket 82 has a pivot 84 securing a depending link 85 thereto. On the lower end of each link 85 is a tubular bearing 86 receiving the transverse rod 78. Accordingly, it becomes obvious that the forward ends of the side members 75 are connected to the brackets 82.

Rotatably supported by the brackets 82 is a shaft 87 and keyed on each of the ends thereof is an eccentric collar 88. Rotatably mounted upon each eccentric collar 88 is a bearing 89, and each bearing 89 has an arm 90 rigidly connected thereto. Each arm 90 has a tubular bearing 91 through which the transverse rod 78 extends. Each eccentric 88 has an integral ear 92, as shown in Fig. 4, and a depending link 93 connected thereto. The lower ends of the links 93 are connected to ears 94 on a reel cover 95 which is secured to the transverse rod 78 as illustrated at 96 and to the reel side members 75 by brackets 97.

The sprocket 81 is connected by a chain 98 to a sprocket 99 supported by the above described sleeve 69 and driven thereby in a manner to be described. The purpose of the particular mounting of the cutting reel with respect to the brackets 82, as described immediately above, is to maintain the distance between the centers of the sprockets 81 and 99 substantially constant when the cutting reel moves vertically because of ground irregularities with which the roller 77 contacts. A further purpose is to permit the cutting reel to be elevated, away from the ground surface, so that it will not be in a cutting position when the mower is moved from one point of operations to another. This mechanism further permits the weight of the cutting reel to be counterbalanced by spring means so that it may be easily raised and lowered by the operator.

Upon the shaft 87 is a rigid arm 100 having a link 101 extending vertically therefrom and carrying a pin 102 which is engaged by the hooked end 103 on a bell crank lever 104. The bell crank 104 is pivoted at 105 upon one of the side frame members 2 and has a tubular element 106 swivelled on the other end thereof. A rod 107 slidably extends through the tubular element and has a head 108a thereon adapted to engage the tubular element upon lengthwise movement of the rod in one direction. The other end of the rod 107 is connected to a lever 108 (Figs. 1 and 2) which is pivoted upon the steering frame 27. The lever 108 has a ratchet device as illustrated at 109 for releasably holding it against movement in one direction.

With the parts of the apparatus in the position shown in Fig. 5, the roller 77 is in engagement with the ground surface. As long as the ground surface is smooth its position will remain unchanged. It is obvious, however, in the event the roller 77 meets an irregularity the roller 77 will be elevated or lowered, according to the type of irregularity. If the roller 77 is moved upwardly, for example, the links 93 are likewise moved upwardly and cause rotation of the eccentrics 88 about the axis of the shaft 87. Such rotation of the eccentrics throws the rods 90 forwardly, thus swinging the links 85 about their pivotal connections with the brackets 82 and causing an upward, arcuate movement of the rod 78 and the cutting reel 80. The center of curvature of this arcuate movement coincides, substantially, with the axis of rotation of the sprocket 99. The exact reverse of all such above described movements takes place in the event the roller 77 encounters a depression in the ground surface and moves downwardly.

If the reel is to be raised to an inoperative position, the operator moves the rod 107 in a direction toward the rear by pulling the lever 108. Such movement of the rod 107 causes the bell crank 104 to rock and the latter, through the connecting link 101 and rigid arm 100, causes the shaft 87 to rock. The rocking movement of the shaft 87 is counterclockwise, as viewed in Fig. 5, and as is apparent, causes the eccentrics 88 to be thrown forward. This movement of the eccentrics causes the ears 92 and links 93 to be raised, and the links 78a to be swung forwardly and the resulting movement of the reel is arcuate, with the center of curvature of the arc coinciding, or substantially coinciding, with the center of rotation of the sprocket 99.

The reel may be held in its elevated position by the releasable means illustrated at 109 for holding the lever. Upon release of said releasable means the reel will lower because of its own weight. During lowering of the reel the above described mechanism for causing it to move in an arcuate path acts in the reverse of that above described and this function is believed apparent without further description.

In order to make easier the raising of the cutting reel in the above described manner a coiled spring 110 is provided to counterbalance the weight thereof. The spring 110 has one end attached to the bell crank 104 and its other end attached to a stationary part on the frame 1. One of the steering frame supports 29 provides a convenient part for the attachment of the spring as illustrated. The spring yieldingly urges rocking movement of the bell crank 104 in a direction tending to cause elevation of the cutting reel.

The above described mechanism completes the power mower and reel assembly with the exception of the driving means for the sprocket 99. For an understanding of this structure reference is again had to Fig. 7. Rotatably mounted upon the sleeve 69 is a sleeve 111 having splines on the exterior thereof. On one end of the sleeve 111 is a flange 112 having a shoulder supporting the sprocket 99, which is of annular form. A disk 113 is slidably mounted upon the sleeve 111 and is resiliently pressed into engagement with the sprocket by springs 114 which are held in compression by set screws 115. The sprocket is interposed between the flange 112 and the disk 113 and the springs 114 induce sufficient friction to cause rotation of the sprocket 99, but in the event an excessive back pressure opposes rotation of the sprocket the flange and disk may rotate with respect thereto. The end of the sleeve 69 has splines 119 thereon and an internally splined sleeve 120 is mounted on the sleeve 111 so that it may be moved lengthwise thereon. In the position shown, the splined sleeve 120 is engaging both sleeves 69 and 111 and it establishes a driving connection therebetween. By moving the splined sleeve 120 toward the left, as shown in Fig. 7, it may be moved out of engagement with the sleeve 69, in which case it would be free to rotate with respect to the sleeve 69.

The means for operating the clutch sleeve 120 comprises a bell crank lever 121 having one end connected through a slidable element 122 and a fork 123 to the internally splined sleeve. The bell crank lever 121 has its other end connected to a rod 124 which may be manually reciprocated by a lever 125 mounted on the steering frame member 28 adjacent the handle piece 116. The clutch thus constituted enables the operator to control the operation of the cutting reel.

In the steering frame member 28 there is provided a rod, similar to the rod 46, having a handle 116 at one end and a lever 117 at its other end. A connector 118 is connected to the lever 117 and the end thereof which is broken away is adapted to be connected to the throttle valve in the carburetor of the engine 4. The connections to the carburetor are already well known to those versed in the art to which this invention pertains and are not, for this reason, shown here.

Under normal conditions of operation, with the engine 4 running, the operator riding upon the sulky puts the mower in motion by rotating the handle piece 47 to engage the clutch elements 37 and 38, thereby causing rotation of the ring gear 48. The ring gear 48 causes rotation of the spider 49a and the pinions 50 cause rotation of the shafts 52 and 56. Shaft 55 will, of course, rotate with the spider. Rotation is transmitted to one of the wheels 10 through the sprocket 53 on the shaft 52, and to the other wheel 10 through shaft 56, collar 61, pin 62 and flange 60 to the sleeve 58 upon which the other sprocket 59 is mounted. With the mower in motion it may be steered by the operator pushing the handle bars to the right or to the left. The normal tendency of such a steering function would be for the handle bars to move away from the sulky so that sharp turns would be difficult to make, but by providing dirigible wheels upon the sulky and foot operated means thereon for steering the same the operator may steer the sulky to the position most convenient for steering purposes.

With the mower in motion the operator may raise or lower the cutting reel at will. By moving the lever 108 forwardly the eccentrics 88 are rotated in a direction to lower the reel, and by moving the lever rearwardly, the eccentrics cause the reel to be elevated. During the elevating and lowering functions the mechanism for supporting the reel acts to maintain a substantially constant distance between the sprockets 81 and 99.

With the clutch sleeve 120 in engagement with the splines on both sleeves 69 and 111 the sprocket 99 will rotate with the driving axles and will thus cause rotation of the cutting reel. By operating the lever 125 the operator may engage or disengage the splined sleeve with its driving part to control the operation of the cutting reel. The cutting reel may, therefore, be held stationary while the mower is in operation.

When the sickle bar type of cutter is used in the present mower, instead of the reel type above described, the reel cutter is dismantled by removing the brackets 82 and disconnecting the link 101 from the bell crank 104. The brackets of the sickle bar cutter unit are then secured to the frame in substantially the same positions that the brackets 82 were in. The sickle bar unit brackets are designated 130 and 131 and they are rigidly secured together by transverse reinforcing members 132. The bracket 131 supports a gear housing 133 containing meshing bevelled gears 134 and 135, the gear 134 being mounted on a shaft 136 having a disk 137 thereon, and the gear 135 being mounted upon a shaft 138 having a sprocket 139 for receiving the chain 98. A driving connection is thus provided between the disk 137 and the sprocket 98, and the driving parts for the latter have been described above.

Secured to the bracket 131 by a universally pivoting connection 139 is a forked support 140, carrying between the forked ends thereof a tubular bearing 141. A substantially U-shaped sickle bar supporting bracket 142 has a pin 143 supported by the two arms thereof and extending through the tubular bearing 141. The bracket 142 supports an elongated sickle bar cutter 144, of the usual form, having a reciprocable cutting element 145 and a ground engaging shoe (not shown) on the outer end thereof. The reciprocable cutting element is connected by a connecting rod 146 and a universal joint 147 to a crank pin 148 on the rotatable disk 137.

The forward end of the bracket 142 is further supported by a bowed rod 149 having a collar 150 and a spring 151 interposed between the collar and the adjacent end of the bracket 130 in which the rod is supported. The forward and downwardly bent end of the rod 149 is connected by a universal joint 152 to a rod 153 which is connected to the forward end of the bracket 142 by a universal joint 154.

It becomes apparent from the foregoing that the sickle bar 154 may swing pivotally about the axis of the pin 143. When the cutter is not in use it may be swung, manually, about the axis of the pin 143 to a substantially vertical position. Although it is not here shown it is contemplated that a releasable means will be provided for holding the sickle bar in its raised position.

Mounted rigidly upon the forked support 140 is a bearing 155 in which is received a shaft 156, the latter being secured to the bearing by a bolt 157 which extends through a slot 158 in the bearing. The slot 158, as shown in Fig. 11 is long enough to permit a small amount of rotation of the shaft relative to the bearing. On the outer end of the shaft 156 is secured an arm 159 and the outer end of the arm is connected by a link 160 to the hooked end 103 of the bell crank lever 104. Thus, by rocking the lever 104 in the manner described above referring to the reel the forked support 140, and the sickle bar carried thereby, may be raised and lowered. In order to counterbalance the weight of support 140 and the sickle bar carried thereby a vertical standard 161 is mounted in a socket 162 by a bayonet slot and pin connection shown at 163. The socket 162 is mounted upon the transverse bracket reinforcing members 132 and has a coiled spring 164 connected to the upper end thereof and to a lug 165 on the link 160.

In order that the entire weight of the sickle bar shall not fall upon the shoe (not shown) which is disposed on the outer end thereof and which slides upon the surface of the ground means is also provided for counterbalancing the end thereof which swings about the axis of the pin 143. This means comprises a lever 166 fulcrumed on the shaft 156 and having a spring 167 normally tending to swing the same about the axis thereof. Pivotally supported by the lever is a bearing 168 having a rod 169 slidably mounted therein. On one end of the rod 169 is a head 170 adapted to be engaged by the adjacent end of the bearing 168 when the latter is moved with the lever 166 in response to the pressure of the spring 167. At its other end the rod 168 is connected to the upper portion 171 of the bracket 142. It will be noted that the portion 171, of the bracket 142, to which the rod 168 is pivotally attached is disposed on the opposite side of the pin 143 to which the sickle bar is attached. The effect of the spring 167 is, therefore, to cause pivotal movement of the bracket about its supporting pin 143 in a direction to swing the sickle bar upwardly.

With the sickle bar in the operative position shown in the drawings it functions in a manner very similar to the reel above described. Due to the fact, however, that it projects outwardly from one side of the mower unit it is necessary for the operator to shift the pin 62 from engagement with the aperture 65 and to place it into engagement with the flange 70 (referring to Fig. 7) to prevent the differential from functioning. With the clutch sleeve 120 in the position shown in this view the sprocket 99 will be driven and the sickle bar cutter operated thereby. As in the case of the reel, the sickle bar cutter may be rendered inoperative by moving the clutch sleeve 120 in a left hand direction, as shown in Fig. 7, by manual actuation of the lever 125. The sickle bar cutter may be raised or lowered, in the same manner as the reel above described, by manual operation of the lever 108.

In order to lock the differential it is necessary to withdraw the pin 62 from the aperture 65, and this leaves the sprocket 59 free to rotate. The sprocket 59 is on the side of the unit remote from the side having the projecting sickle bar and, therefore, the unit is driven on one side only. The unit and sickle bar thus tend to counterbalance each other so that the steering function may be easily attained.

Although a specific embodiment of the mower unit has been shown and described, and also the manner in which it may be used with either a reel type cutter or a sickle bar type cutter, it will be understood that various changes may be made in the details of construction without departing from the spirit of the invention, and such changes are contemplated.

What I claim is:—

1. A motor mower unit comprising a frame having a wheel at the forward end adapted to swivel about a vertical axis, a pair of independently rotatable wheels at the rear of said frame, an engine supported by said frame adjacent said wheels, a differential gearing supported by said frame in advance of said pair of wheels, driving means between said differential gearing and engine including a clutch, means operatively connecting said differential gearing to said pair of wheels, handle bars on said unit, and a control in said handle bars operatively connected to said clutch.

2. A motor mower unit comprising a frame having a wheel at the forward end adapted to swivel about a vertical axis, a pair of independently rotatable wheels at the rear of said frame, an engine supported by said frame adjacent said wheels, a differential gearing supported by said frame in advance of said pair of wheels, driving means between said differential gearing and engine including a clutch, means operatively connecting said differential gearing to said pair of wheels, handle bars on said unit, a control in said handle bars operatively connected to said clutch, a mower carried by said frame in advance of said pair of wheels, and means operable from a point on said handle bars for selectively connecting said mower with a movable part connected with said differential gearing for selectively operating the same.

3. A motor mower unit comprising a frame having a wheel at the forward end adapted to swivel about a vertical axis, a pair of independently rotatable wheels at the rear of said frame, an engine supported by said frame adjacent said wheels, a differential gearing supported by said frame in advance of said pair of wheels, driving means between said differential gearing and engine including a clutch, means operatively connecting said differential gearing to said pair of wheels, handle bars on said unit, a control in said handle bars operatively connected to said clutch, a mower carried by said frame in advance of said pair of wheels, means operable from a point on said handle bars for selectively connecting said mower with a movable part connected with said differential gearing for selectively operating the same, and means operable from a point on said handle bars for raising and lowering said mower.

4. A motor mower unit comprising a frame having a wheel at the forward end adapted to swivel about a vertical axis, a pair of independently rotatable wheels at the rear of said frame, an engine supported by said frame adjacent said wheels, a differential gearing supported by said frame in advance of said pair of wheels, driving means between said differential gearing and engine including a clutch, means operatively connecting said differential gearing to said pair of wheels, handle bars on said unit, a control in said handle bars operatively connected to said clutch, a mower carried by said frame in advance of said pair of wheels, means operatively connecting said mower with a moving part connected with said differential gearing, and means operable from a point on said handle bars for raising and lowering said mower.

5. Apparatus as defined in claim 2 having means for rendering said differential gearing inoperative.

6. The combination in a motor mower having a frame of a cutter unit, means pivotally connecting said cutter unit with said frame, a ground contacting member cooperating with said pivotal connecting means to support said cutter unit, and pivot shifting means having connection with said pivotal connecting means and with the cutter unit for effecting raising and lowering of said cutter unit when the ground contacting member engages ground irregularities.

7. The combination in a motor mower having a frame of a reel cutter unit, means pivotally connecting said reel cutter unit with said frame, a ground contacting member cooperating with said pivotal connecting means to support said reel cutter unit, pivot shifting means having connection with said pivotal connecting means and with the reel cutter unit for effecting raising and lowering of said cutter unit when the ground contacting member engages ground irregularities, a driven member on said frame, a cooperative driven member on the reel cutter unit, and a driving connection between said driven members, said shifting means being arranged to effect arcuate movement of the axis of said reel cutter unit substantially about the center of said driven member on the frame.

8. The combination in a motor mower having a frame of a cutter unit, means pivotally connecting said cutter unit with said frame, a ground contacting member cooperating with said pivotal connecting means to support said cutter unit, pivot shifting means having connection with said pivotal connecting means and with the cutter unit for effecting raising and lowering of said cutter unit when the ground contacting member engages ground irregularities, and manual means for raising and lowering said cutter unit.

9. The combination in a motor mower having a frame of a cutter unit, means pivotally connecting said cutter unit with said frame, a ground contacting member cooperating with said pivotal connecting means to support said cutter unit, pivot shifting means having connection with said pivotal connecting means and with the cutter unit for effecting raising and lowering of said cutter unit when the ground contacting member engages ground irregularities, and resilient means counterbalancing the weight of said cutter unit.

10. The combination in a motor mower having a frame of a cutter unit, a link pivotally suspending the cutter unit from the frame, a ground contact member cooperating with said link for supporting said cutter unit, an eccentric rotatably mounted on the frame, a collar mounted on the eccentric, an arm connecting said collar with said link, and means connecting the cutter unit with said collar to effect oscillation of said collar on the eccentric incidental to pivotal movement of said cutter unit when the ground contact member engages ground irregularities to effect swinging movement of said link for raising and lowering the cutter unit.

11. The combination in a motor mower having a frame of a cutter unit, a link pivotally suspending the cutter unit from the frame, a ground contact member cooperating with said link for supporting said cutter unit, an eccentric rotatably mounted on the frame, a collar on the eccentric, an arm connecting said collar with said link, means connecting the cutter unit with said collar to effect oscillation of said collar on the eccentric incidental to pivotal movement of said cutter unit when the ground contact member engages ground irregularities to effect swinging movement of said link for raising and lowering the cutter unit, and manual means for selectively positioning the eccentric on the frame to raise and lower the cutter unit independently of said ground contact member.

12. The combination in a motor mower having a frame of a cutter unit, a link pivotally suspending the cutter unit from the frame, a ground contact member cooperating with said link for supporting said cutter unit, an eccentric rotatably mounted on the frame, a collar mounted on the eccentric, an arm connecting said collar with said link, means connecting the cutter unit with said collar to effect oscillation of said collar on the eccentric incidental to pivotal movement of said cutter unit when the ground contact member engages ground irregularities to effect swinging movement of said link for raising and lowering the cutter unit, a bell crank lever on the frame, connecting means between the bell crank lever and said eccentric, and manual means connected with the bell crank lever for selectively positioning the eccentric on the frame to raise and lower the cutter unit independently of said ground contact member.

13. In a machine of the character described, a frame, wheels supporting the frame for independent rotation, a differential gearing on the frame, a motor on the frame, means connecting the motor with said differential gearing, driving means connecting the wheels with said differential gearing, a mower unit suspended from the frame, and a driving connection between the differential gearing and the mower unit independently of said driving connections with the wheels.

14. In a machine of the character described, a frame, a mower unit carried by the frame, ground wheels supporting the frame for independent rotation, a motor on the frame, differential gearing on the frame including a ring gear, a spider connected with the ring gear, a differential pinion carried by the spider, differential gears meshing with the differential pinion, means respectively connecting the differential gears with said wheels, and a driving connection between said spider and the mower unit.

15. In a machine of the character described, a frame, a mower unit carried by the frame, ground wheels supporting the frame for independent rotation, a motor on the frame, differential gearing on the frame including a ring gear, a spider connected with the ring gear, a differential pinion carried by the spider, differential gears meshing with the differential pinion, means respectively connecting the differential gears with said wheels, a shaft connected with the spider, a driving connection between said shaft and mower unit, clutch means in said connection, and means selectively connecting said shaft with one of said differential gears including means for disconnecting the wheel actuated by said differential gear.

16. In a machine of the character described, a frame, a mower unit carried by the frame, ground wheels supporting the frame for independent rotation, a motor on the frame, differential gearing on the frame including a ring gear, a spider connected with the ring gear, a differential pinion carried by the spider, differential gears meshing with the differential pinion, means respectively connecting the differential gears with said wheels, a shaft connected with the spider, a sprocket rotatable about the axis of said shaft, means connecting the sprocket with the mower unit, a driven member fixed to the shaft, clutch means connecting the driven member with the sprocket, and means selectively connecting said driven member with one of said differential gears including means for disconnecting the wheel actuated by said gear.

17. A motor mower unit comprising a frame having a wheel at the forward end adapted to swivel about a vertical axis, a pair of independently rotatable wheels at the rear of said frame, an engine supported by said frame adjacent said wheels, a differential gearing supported by said frame in advance of said pair of wheels, driving means connecting said differential gearing and engine including a clutch, means operatively connecting said differential gearing to said pair of wheels, handle bars on said unit, a control in said handle bars operatively connected to said clutch, a mower carried by said frame in advance of said pair of wheels, means operatively connecting said mower with a moving part connected with said differential gearing, means operable from a point on said handle bars for raising and lowering said mower, and resilient means counterbalancingly connected with the mower to counterbalance the weight of the mower.

MELVIN WADDELL.